United States Patent
Hsiao et al.

(10) Patent No.: US 9,419,878 B2
(45) Date of Patent: Aug. 16, 2016

(54) NETWORK CONTROLLER FOR DELAY MEASUREMENT IN SDN AND RELATED DELAY MEASUREMENT SYSTEM AND DELAY MEASUREMENT METHOD

(71) Applicant: Industrial Technology Research Institute, Chutung, Hsinchu (TW)

(72) Inventors: Tai-Hua Hsiao, Hsinchu (TW); Wen-Hung Chang, Hsinchu (TW)

(73) Assignee: Industrial Technology Research Institute, Chutung (TW)

( * ) Notice: Subject to any disclaimer, the term of this patent is extended or adjusted under 35 U.S.C. 154(b) by 60 days.

(21) Appl. No.: 14/336,182

(22) Filed: Jul. 21, 2014

(65) Prior Publication Data
US 2015/0163114 A1 Jun. 11, 2015

(30) Foreign Application Priority Data
Dec. 6, 2013 (TW) .............................. 102144763 A

(51) Int. Cl.
*H04L 12/16* (2006.01)
*H04L 12/26* (2006.01)
*H04L 12/721* (2013.01)

(52) U.S. Cl.
CPC ............ *H04L 43/0864* (2013.01); *H04L 43/10* (2013.01); *H04L 45/36* (2013.01); *H04L 45/38* (2013.01)

(58) Field of Classification Search
None
See application file for complete search history.

(56) References Cited

U.S. PATENT DOCUMENTS

| 7,292,537 | B2 | 11/2007 | Charcranoon |
| 8,072,906 | B2 | 12/2011 | Naghian |
| 8,306,420 | B2 | 11/2012 | Conklin et al. |
| 2004/0264372 | A1 * | 12/2004 | Huang .................... H04L 45/00 370/230 |
| 2008/0225713 | A1 * | 9/2008 | Tychon ................. H04L 45/125 370/231 |

FOREIGN PATENT DOCUMENTS

| CN | 102474373 A | 5/2012 |
| CN | 102946365 A | 2/2013 |
| CN | 103326946 A | 9/2013 |
| CN | 103346969 A | 10/2013 |

(Continued)

OTHER PUBLICATIONS

Angrisani et al., "Measurement of Proceessing and Queuing Delays Introduced by an Open-Source Router in a Single-Hop Network," *IEEE transactions on Instrumentation and Measurement*, 55(4):1065-1076 (2006).

(Continued)

*Primary Examiner* — Jenee Williams
(74) *Attorney, Agent, or Firm* — McCarter & English, LLP; Yu Lu

(57) ABSTRACT

A network controller for delay measurement in SDN and related delay measurement system and delay measurement method are provided. A probe packet is used to record the transmission of the probe packet between the network controller and network switches, to calculate a transport delay time between the network switches and hop delay time between the network switches, to obtain the delay of each link in the transmission path, which helps in finding out a critical hop in the SDN transmission path. Through the delay measurement mechanism according to the present disclosure, the critical hop will become a reference based on which a network manager adjusts a network framework, or a basis taken by an SDN control system to select a path.

10 Claims, 6 Drawing Sheets

(56) References Cited

FOREIGN PATENT DOCUMENTS

| EP | 2278738 A1 | 1/2011 |
|---|---|---|
| TW | 201208406 A | 2/2012 |
| WO | WO-2012130264 A1 | 10/2012 |

OTHER PUBLICATIONS

De Vito et al., "One-Way Delay Measurement: State of the Art," *IEEE Transactions on Instrumentation and Measurement*, 57(12):2742-2750 (2008).

Kurose and Ross, "End-to-End Delay; Traceroute," *Computer Networking: A Top-Down Approach*, 6th Edition, Chapt. 1, pp. 42-44 (2012).

Lee et al., "Opportunistic Flow-Level Latency Estimation Using Consistent NetFlow," *IEEE/ACM Transactions on Networking*, 20(1):139-152 (2012).

Papagiannaki et al., "Measurement and Analysis of Single-Hop Delay on an IP Backbone Network," *IEEE Journal on Selected Areas in Communication*, pp. 1-14 (2003).

Rotsos et al., "OFLOPS: An Open Framework for OpenFlow Switch Evaluation," *PAM*, 10 pages (2012).

English abstract of CN 102474373A.
English abstract of CN 102946365A.
English abstract of TW 201208406.
English abstract of CN 103326946.
English abstract of CN 103346969.
Office Action issued Oct. 27, 2015 in TW 10421452170.

\* cited by examiner

NETWORK CONTROLLER FOR DELAY MEASUREMENT IN SDN AND RELATED DELAY MEASUREMENT SYSTEM AND DELAY MEASUREMENT METHOD

CROSS-REFERENCE TO RELATED APPLICATION

This application claims foreign priority under 35 U.S.C. §119(a) to patent application No. 102144763, filed on Dec. 6, 2013, in the Intellectual Property Office of Ministry of Economic Affairs, Republic of China (Taiwan, R.O.C.), the entire content of which patent application is incorporated herein by reference.

BACKGROUND OF THE INVENTION

1. Technical Field

This disclosure relates to a network controller for delay measurement in SDN and related delay measurement system and delay measurement method.

2. Background

Transmit delay inevitably occurs in network transmission, and is a crucial index of the operation efficiency of a network. When severe delay occurs, not only the packet transmitting is getting slow explicitly, some of the network transmission equipment (e.g., network switches or routers) also suffer from an operation bottleneck. Therefore, the transmit delay is an important issue of transmission quality for network operators, since it involves whether a variety of application systems could execute smoothly. For a Voice over IP system, severe delay results in intermittent voices, and both parties cannot communicate with each other clearly and fluently. It is thus important to find out the critical delay. However, a general measurement method or tool finds out the path delay only, and the improvement process is performed on the switching of the whole path. In other words, the improvement process cannot perform the switching or changing the network equipment precisely because there is no delay information for each link of the network.

Software defined network (SDN) is a transmission network, and also suffers from the transmit delay. One of the control protocols used in SDN is OpenFlow, which is proposed by Open Networking Foundation (ONF), and applied to a communication protocol of a network controller and a network switch. It is the centralized network management model, and a powerful network controller could direct multiple network switches. In the protocol, a variety of statistic information relating to traffics, including packets, bytes and flows, are also defined. However, the delay of the network cannot be figured out by using the information. An active delay measurement technique injects a great number of probe packets into the networks, records and compares the time when the probe packets pass each hop, and figures out the delay of each link. However, the active delay measurement technique needs highly precise timing synchronous, and consumes the majority of the network resources. A passive delay measurement technique measures the delay of a packet at in/out interfaces of a hop under detection. However, the passive delay measurement technique requires identifying the packet under detection among a huge number of packet flows, and also needs the highly precise clock synchronous. In general, the passive delay measurement technique needs a central management and control system to control the timing synchronous and measurement delay, and thus requires a more complicated framework and packet comparison process. The central management and control power further limits the measurement range of the passive delay measurement technique.

Therefore, to find out a method that could measure each link delay in a path under the current SDN control protocol and find out the critical delay, to be a reference for subsequent improvement process, is becoming an urgent issue in the art.

SUMMARY OF THE INVENTION

The present disclosure provides a network controller for delay measurement in a software defined network (SDN), comprising: an initialization module that acquires a list of network switches on a path-under-measurement and transmits a flow entry to a flow table of a head network switch in the path-under-measurement; a head measurement module that measures an echo-response time between the head measurement module and the head network switch, launches a probe packet to the head network switch, and measures a first forward command-query time taken by the probe packet to make a roundtrip of the head network switch; a regular measurement module that measures a first transport delay time taken by the probe packet to travel from the head network switch to the next network switch and a second forward command-query time taken by the probe packet to make a roundtrip between the regular measurement module and the next network switch, wherein the next network switch then forwards the probe packet to a further next network switch, and the regular measurement module measures a second transport delay time taken by the probe packet to travel from the next network switch to the further next network switch and a third forward command-query time; and a delay calculation module that calculates a hop delay time of the head network switch from the echo response time and the first forward command-query time, calculates a first total nodal delay time from the echo response time, the first transport delay time, and the second forward command-query forward command-query time, and calculates a second total nodal delay time from the second forward command-query time, the second transport delay time and the third forward command-query time, wherein the regular measurement module measures transport delay time and forward command-query time of other network switches in the path-under-measurement following the further next network switch in a same way as measuring the transport delay time and the forward command query time of the further next network switch, and the delay calculation module calculates total nodal delay time of the other network switches.

The present disclosure further provides a delay measurement method in SDN, comprising: enabling a network controller to transmit a control message to a head network switch, so as to add a flow entry in a flow table of a head network switch; enabling the network controller to transmit a probe packet to the head network switch, so as for the head network switch to forward the probe packet to the network controller and a next network switch according to the flow entry of the flow table, wherein the network controller records an echo-response time between the network controller and the head network switch and a first forward command-query time taken by the probe packet to make a roundtrip between the network controller and the head network switch to calculate a hop delay time of the heat network switch from the first forward command-query time and the echo-response time; enabling the next network switch, after receiving the probe packet, to transmit a forward query message that has the probe packet to the network controller, and enabling the network controller to transmit a forward command that has the probe packet to the next network switch to direct the next network switch to transmit the probe packet to the network controller and a further next network switch; and enabling the network controller to record a first transport delay time taken by the probe packet to travel from the head network switch to the next network switch and a second forward command-query time taken by the probe packet to make a roundtrip between the network controller and the next network switch, so as to calculate a first total nodal delay time from the echo-response time, the first transport delay time and the second forward command-query time, to record a second transport delay time and a third forward command-query time in a same way as recording the first transport delay time and the second forward command-query time, respectively, to calculate a second total nodal delay time from the second forward command-query time, the second transport delay time and the third forward command-query time, and to obtain a total nodal delay time between two consecutive network switches following the further next network switch based on the above measurement and calculation mechanisms for the second total nodal delay time.

The present disclosure yet further provides a delay measurement system in SDN, comprising: a network controller that measures a path-under-measurement and launches a probe packet, to record an echo-response time between the network controller and one of network switches in the path-under-measurement, a roundtrip time taken by the probe packet to make a roundtrip of the one of the network switches, and a first transport delay time between two consecutive network switches in the network switches; a head network switch that, after receiving the probe packet, returns the probe packet to the network controller and to a next network switch in the path-under-measurement according a flow entry predetermined by a flow table of the head network switch; and the next network switch that receives the probe packet and, after receiving the probe packet, launches a forward query message to the network controller to obtain a transmission destination of the probe packet, the transmission destination including returning to the network controller and transmitted to a following network switch, wherein the network controller calculates a hop delay time of a head network switch from an echo-response time between the network controller and the head network switch and a first forward command-query time taken by the probe packet to make a roundtrip between the network controller and the head network switch, calculates a first total nodal delay time from the echo-response time, a first transport delay time taken by the probe packet to travel from the head network switch to the next network switch, and a second forward command-query time taken by the probe packet to make a roundtrip between the network controller and the next network switch, measures a second transport delay time and a third forward command-query time in a same way as measuring the first transport delay time and the second forward command-query time, respectively, and calculates a second total nodal delay time from the second forward command-query time, the second transport delay time and the third forward command-query time, to obtain a total nodal delay time between two following consecutive network switches based on the above measurement and calculation mechanisms for the second total nodal delay time.

BRIEF DESCRIPTION OF THE DRAWINGS

The disclosure could be more fully understood by reading the following detailed description of certain embodiments, with reference made to the accompanying drawings.

DETAILED DESCRIPTION OF THE INVENTION

Figure 1:
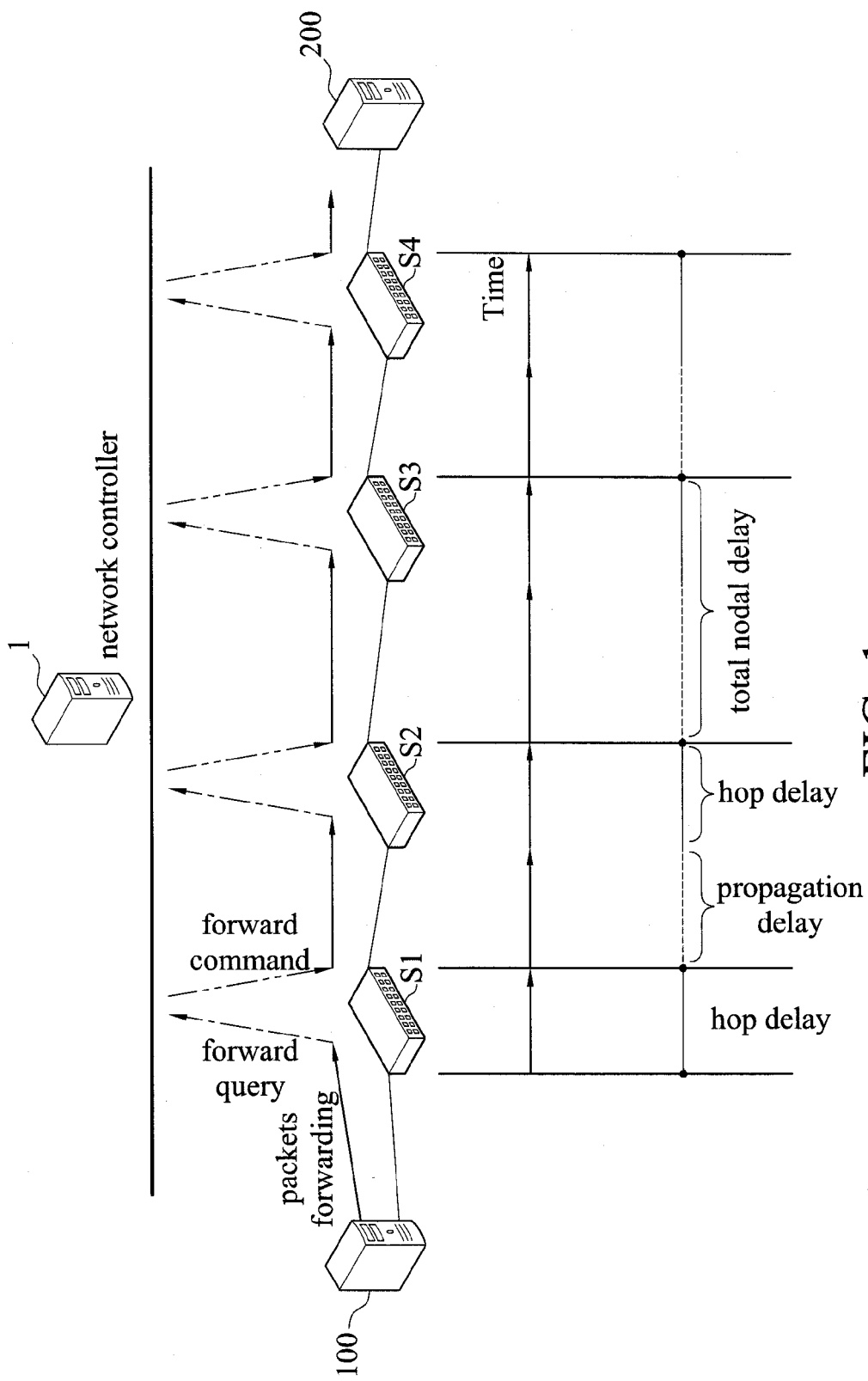
FIG. 1 is a schematic diagram illustrating an OpenFlow operation model of a network controller and switches in SDN, and related delays according to the present disclosure. The top part of the figure illustrates how the network controller and the network switches process a first packet in the flow packets. The middle part shows that, in the instant invention, a new flow entry is only added to the head network switch, and the remaining packets forwarding the other switches are always directed by the network controller. Meanwhile, conventionally, the network controller establishes in each network switch a flow entry that directs the network switches to forward the packet, and the remaining packets belonging to the same flow will be forwarded hop by hop according to the newly added flow entry within each network switch.

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

Refer to FIG. 1, which is a schematic diagram illustrating an OpenFlow operation principle of a network controller and switches in SDN, and related delays according to the present disclosure. A network delay measurement mechanism provided according to the present disclosure is performed in an SDN environment, and employs a control protocol of an OpenFlow of the SDN itself. A probe packet is used to measure the delay of links in a transmission path one by one, in order to find out a critical delay. The present disclosure is performed by merely borrowing the OpenFlow operation mechanism, and the basic operations of the OpenFlow are thus first described as follows.

As shown in FIG. 1, the OpenFlow system has to establish a transmission path, e.g., from equipment 100 to equipment 200, in order to transmit data. After a first packet in the same Flow is launched from the equipment 100 and enters into a network switch in a network the first time, the network switch does not know how to forward the packet in the beginning. The network switch uses forward query instructions in the OpenFlow (e.g., Packet_In) to query a network controller 1 about how to forward the first packet. After receiving the query message, the network controller 1 gets to know a transmission destination where the first packet is going to be forwarded by flooding, searching and routing operations, and then uses forward command instructions (e.g., Packet_out) to instruct the network switch to forward the packet to one port of itself and add this flow entry with routing information to a flow table of the network switch. Then, the network switch could merely follow the instructions of the flow table to determine whom the normal data should be forward to, without querying the network controller 1 any longer.

As shown in FIG. 1, a flow passes four network switches. Delays occur in the transmission of packets inevitably, because the packets will be packet header parsing, table lookup and forwarding every time they pass the network switches (S1-S4). The delay due to the process time within a network switch is called a hop delay. A packet transmitted between two network switches suffers from a propagation delay. Two adjacent hop-propagation delays are summed to become a total nodal delay. In this example, the four network switches have a hop delay and three total nodal delays. According to the present disclosure, some control messages for the OpenFlow operations are changed, in order to evaluate the delay of each link.

Figure 2:
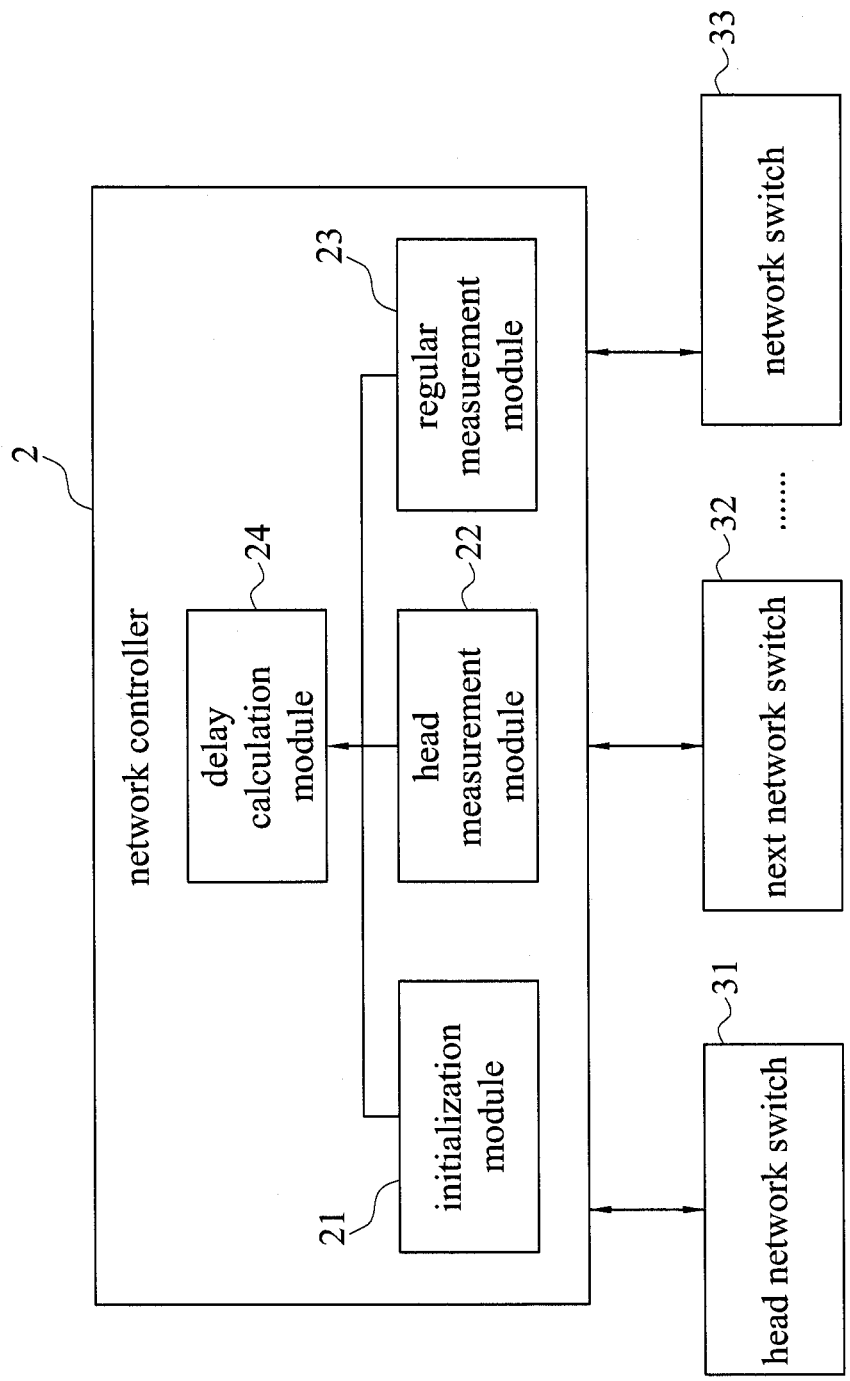
FIG. 2 is a functional block diagram of a network controller for delay measurement in SDN according to the present disclosure.

Refer to FIG. 2, which is a functional block diagram of a network control 2 for delay measurement in SDN according to the present disclosure. The network controller 2 is used to measure network link delays. The network controller 2 uses a probe packet, and obtains a hop delay in the head network switch 31 that is generated due to packet parsing, table lookup and forwarding and a total nodal delay of the probe packet transmitted between two network switches, by measuring and calculating processing time of the probe packet launched and forwarded between the network controller 2 and a head network switch 31, a next network switch 32 and a plurality of following possible network switch 33. Therefore, the following link delays could be measured further.

The network controller 2 comprises an initialization module 21, a head measurement module 22, a regular measurement module 23, and a delay calculation module 24.

The initialization module 21 acquires a list of all network switches in the path-under-measurement initially, and then transmits a flow entry with forwarding information to the head network switches 31 of all the network switches (a network switch that the flow packet first meets). The flow entry could be stored in a flow table of the head network switch 31 in the path-under-measurement. The head network switch 31 forwards the probe packet according this flow entry in the flow table, returns the probe packet to the head measurement module 22, and forwards the probe packet to the next network switch 32, i.e., returning the probe packet to the network controller 2 and forwarding the probe packet to the next network switch at same time.

The head measurement module 22 is used to measure an echo-response time between the network controller 2 and the head network switch 31. The echo-response time is referred to time taken by the head measurement module 22 to launch an echo-request to the head network switch 31 and taken by the head network switch 31 to immediately response an echo-reply to the head measurement module 22. In other words, the echo-response time between the network controller 2 and the head network switch 31 is obtained by measuring the response time taken by the echo-request and the echo-reply between the network controller 2 and the head network switch 31. Then, the head measurement module 22 launches the forward command with the probe packet to start the delay measurement.

After the head measurement module 22 launches the forward command with the probe packet to the head network switch 31, the head network switch 31 forwards the probe packet according to the flow entry newly added in the flow table, with one of destinations being the network controller 2 and another being the next network switch 32. The head measurement module 22 get a first forward command-query time by launching the forward command with probe packet to the head network switch 31 and receiving the probe packet from the head network switch 31. The first forward command-query time includes time taken by the head network switch 31 to process the probe packet and the echo-response time between network controller 2 and head network switch 31.

The regular measurement module 23 is used to measure a first transport delay time taken by the probe packet to travel between the head network switch 31 and the next network switch 32, and a second forward command-query time taken by the probe packet to leave from the network controller 2 and immediately return to the network controller 2 from a next network switch 32. More specifically, the second forward command-query time is referred to time taken by the regular measurement module 23 to launch the probe packet and taken by the regular measurement module 23 to receive the probe packet returned from the next network switch 32. The second forward command-query time includes the time taken by the next network switch 32 to process the probe packet.

In addition to querying the network controller 2 for the transmission destination, the probe packet is forwarded to a further next network switch (e.g., a network switch 33). Similarly, a second transport delay time and a third forward command-query time taken by the probe to travel between the regular measurement module 23 and the further next network switch could be measured.

The delay calculation module 24 is used to calculate a hop delay time of the head network switch 31 from the echo-response time and the first forward command-query time measured by the head measurement module 22, i.e., a hop delay time that is generated due to packet parsing, table lookup and forwarding performed in the head network switch 31, by subtracting the echo-response time of the head network switch 31 from the first forward command-query time. The delay calculation module 24 further calculates a first total nodal delay time between the head network switch 31 and the next network switch 32 from the echo-response time, a first transport delay time between the head network switch 31 and the next network switch 32, and a second forward command-query time measured by the regular measurement module 23, i.e., a first total nodal delay generated by a propagation delay time between the head network switch 31 and the next network switch 32 added by a hop delay time of the next network switch 32.

Similarly, the delay calculation module 24 could also calculate a second total nodal delay time between the next network switch 32 and the further network switch from the second forward command-query time, the second transport delay time and the third forward command-query time, i.e., a second total nodal delay generated by a propagation delay time between the next network switch 32 and the further network switch added by a hop delay time of the further next network switch.

As described previously, the conventional delay measurement mechanism obtains the delay time between two network switches in a very inefficient manner. However, the above mechanism is used to calculate a first hop delay time of a head network switch and the total nodal delay time of network switches following the head network switch.

Figure 3:
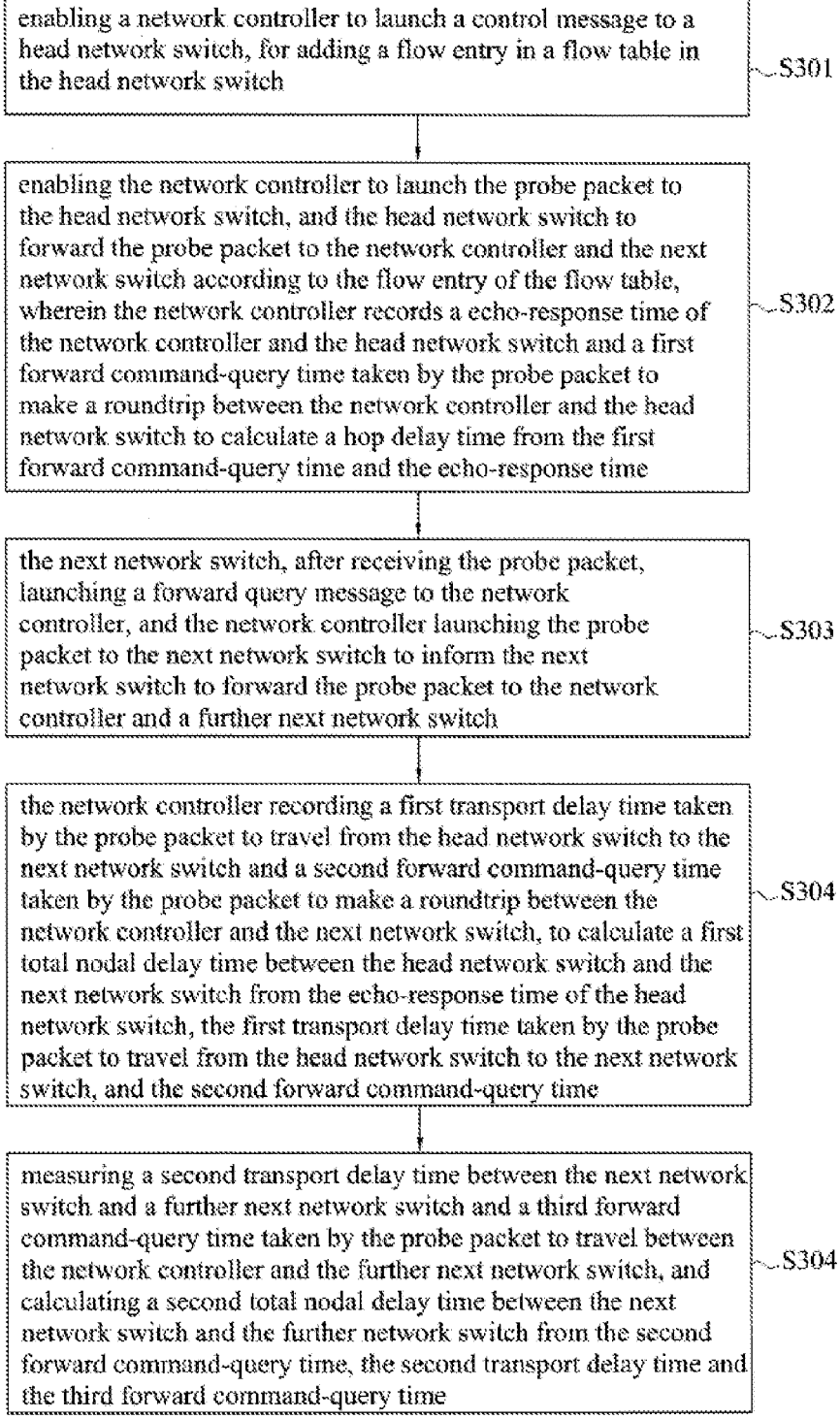
FIG. 3 is a flow chart of a delay measurement method in SDN according to the present disclosure.

Refer to FIG. 3, which is a flow chart of a delay measurement method in SDN according to the present disclosure. In step S301, a network controller is enabled to launch a control message to a head network switch, for adding a flow entry in a flow table in the head network switch. The network controller provides the head network switch with a forwarding information for the probe packet, i.e., the network controller transmitting the flow entry to the flow table of the head network switch in the path-under-measurement for storage. Then, the probe packet, after arriving at the head network switch, will be forwarded according to the flow entry. As described in the previous embodiment, the flow entry includes returning the probe packet to the network controller and forwarding the probe packet to the next network switch. Proceed to step S302.

In step S302, the network controller is enabled to launch the forward command with probe packet to the head network switch, and the head network switch forwards the probe packet to the network controller and the next network switch according to the flow entry of the flow table. The network controller records the echo-response time between the network controller and the head network switch and the first forward command-query time taken by the probe packet to make a roundtrip between the network controller and the head network switch. The hop delay time of the head network switch could thus be calculated from the first forward command-query time and the echo-response time. The echo-response time is the response time taken by the echo packet (e.g., Echo-Request and Echo-Reply) between the network controller and the head network switch. Then, the probe packet could be forwarded to activate delay measurement. The probe packet is forwarded according to the flow entry, and the first forward command-query time taken by the probe packet to make a roundtrip between the network controller and the head network switch could be calculated. The hop delay time of the head network switch could be calculated from the first forward command-query time and the echo-response time. In step S302, the hop delay time is calculated. After the forward command with probe packet is launched by the network controller to the head network switch, the head network switch will forward the probe packet back to the network controller and the next network switch according to the flow entry. At the same time, the network controller records the echo-response time of the network controller and the head network switch and the first forward command-query time taken by the probe packet to make a roundtrip between the network controller and the head network switch, and subtracts the first forward command-query time by the echo-response time, to obtain the hop delay time. Proceed to step S303.

In step S303, the next network switch, after receiving the probe packet, processes packet header parsing, table lookup but finds no entry matched, such that the next network switch launches a forward query message having the probe packet to the network controller, and the network controller launches a forward command having the probe packet to the next network switch to direct the next network switch that the probe packet should be forwarded to the network controller and a following network switch. Step S303 describes a process mechanism of the next network switch when receiving the probe packet. Since it is also the first time for the next network switch to meet the probe packet, the next network switch will launch the forward query message to the network controller to obtain the forwarding information. The next network switch will be directed that the probe packet shall be returned to the network controller and forwarded to the following network switch at the same time.

Compared with the head network switch, which has the flow entry in the flow table, the next network switch does not have the flow entry for forwarding information for probe packet. The process of forwarding the packet will be presented in a real state, i.e., when the probe packet arrives at the next network switch, the header of probe packet will be parsed, and the flow table lookup is executed. The process time is exhaust (i.e., hop delay time), but no flow entry is matched, such that the next network switch will launch a forward query to the network controller and such a processing time is close to the processing of a general packet. Proceed to step S304.

In step S304, the network controller records the first transport delay time of the probe packet from the head network switch to the next network switch and the second forward command-query time taken by the probe packet to make a reflective roundtrip between the network controller and the next network switch. The first total nodal delay time is calculated from the echo-response time of the head network switch, the first transport delay time from the head network switch to the next network switch, and the second forward command-query time taken by the probe packet to make a reflective roundtrip between the network controller and the next network switch. A control packet delay occurs when the probe packet is transmitted from the network controller to the next network switch, this delay should be subtracted because that it is happened on first packet of a flow only, the other subsequent packets have no such extra behavior. The delay time of the probe packet between the network controller and the next network switch could be deemed as the second forward command-query time, because of the probe packet within forward command, and it has carried the destinations of probe packet, which are network controller and further next switch. This procedure requires neither any flow table lookup process nor any other processing time. Lastly, the first total nodal delay time could be calculated according to the echo-response time, the first transport delay time and the second forward command-query time. The so-called first total nodal delay time is a propagation delay between the head and the next network switch plus a hop delay of the next network switch.

In specific, the first total nodal delay time is equal to the first transport delay time added by a half of the echo-response time and subtracted by a half of the second forward command-query time.

The above paragraphs only describe how to calculate the delay between the head network switch and the next network switch. According to the above-described measurement and calculation mechanisms, a total nodal delay time between two network switches could be obtained by measuring and calculating the echo-response time between the network controller and each of the network switches and the transport delay time between the network switches. Proceed to step S305.

In step S305, a second transport delay time between the next network switch and a further next network switch and a third forward command-query time taken by the probe packet to travel between the network controller and the further next network switch are measured, and a second total nodal delay time is calculated from the second forward command-query time, the second transport delay time and the third forward command-query time. Similarly, the second total nodal delay time could be calculated from the second forward command-query time, the second transport delay time taken by the probe packet to travel from the next network switch to the further next network switch, and the third forward command-query time taken by the probe packet to travel between the network controller and the further next network switch.

A total nodal delay time between any two consecutive network switches following the further next network switch could be calculated in the same manner as the second total nodal delay time.

The delay measurement method in SDN may constitute a delay measurement system that measures the state of each link delay. The delay measurement system comprises a network controller and a series of network switches, and will be described in association with FIG. 2.

The network controller 2 is used to measure the link delay of a path-under-measurement. The network controller 2 launches a forward command with probe packet, which will be not only forwarded by network switches 31 to 33 to a following network switch, but also returned to the network controller 2. The network controller 2 calculates the delay time between the network switches according to the transport delay time of the probe packet when the probe packet is forwarded between the network switches 31 to 33 every time, and the echo-response time taken by the network controller 2 to launch the probe packet, taken by the network switches 31 to 33 to process the probe packet, and taken by the network switches 31 to 33 to return the probe packet immediately to the network controller 2. The network controller 2 records the echo-response time between the network controller and the head network switch, the forward command-query time taken by the probe packet to travel between the network controller and the network switches, and the transport delay time between two consecutive network switches. The echo-response time is referred to time taken by the network controller 2 to launch the echo-request to the head network switch 31, and taken by the head network switch 31 to immediately launch the echo-reply to the network controller 2. The transport delay time is referred to time taken by the probe packet to be launched from the network controller to the network switch, taken by the network switch to process the probe packet, and taken by the network switch to return the probe packet to the network controller. The hot delay time of the head network switch 31 could be calculated from the first forward command-query time and the echo-response time. The probe packet will be forwarded to a next network switch according to the flow entry or the command of network controller. Therefore, it takes transport delay time to transmit the probe packet from a network controller, network switch to a next network switch and back to network controller. Through the above-described measurement and calculation, the delay time of the network switch and the network controller could be inferred.

The head network switch 31 is the first to receive the probe packet, and return the probe packet to the network controller 2 and forward the probe packet to the next network switch 32 in the path-under-measurement (i.e., the next network switch 32 in the embodiment) according to a flow entry preset to a flow table of the head network switch 31. Since the head network switch 31 is the first network switch that the probe packet meets and the flow table of the head network switch 31 already has the flow entry stored in the initial state, therein, the probe packet could thus be returned to the network controller 2 and the next network switch 32. The head network switch 31 is the network switch that has its flow table predetermined by the network controller. Therefore, the head network switch 31, after receiving the probe packet, transmits the probe packet according to the destination defined in flow entry of a flow table.

The next network switch 32 is used to receive the probe packet forwarded from the head network switch 31, and send a forward query message to the network controller 2, to obtain the transmission destination of the probe packet. The transmission destination includes returned to the network controller 2 and transmitted to a following network switch (i.e., the network switch 33 in the embodiment). Therefore, the hop delay time could be calculated through the forward command-query time between the network controller 2 and the head network switch 31 and the echo-response time between network switch 31 and the network controller 2.

The network controller 2 calculates the hop delay time of the head network switch according to the echo-response time and the first forward command-query time taken by the probe packet to make a roundtrip including packet processing between the network controller 2 and the head network switch 32. The hop delay time is referred to the delay time generated due to packet header parsing, table lookup and forwarding processes.

The network controller 2 calculates the first total nodal delay time according to the echo-response time between the network controller 2 and the head network switch 31, the first transport delay time taken by the probe packet to travel from the head network switch 31 to the next network switch 32, and the second forward command-query time taken by the probe packet to make a reflective roundtrip between the network controller 2 and the next network switch 32.

Through the above-described measurement and calculation mechanisms, the delay condition between two consecutive network switches following the further next network switch 33 could be obtained, which helps providing a solution for the delay subsequently.

Figure 4A:
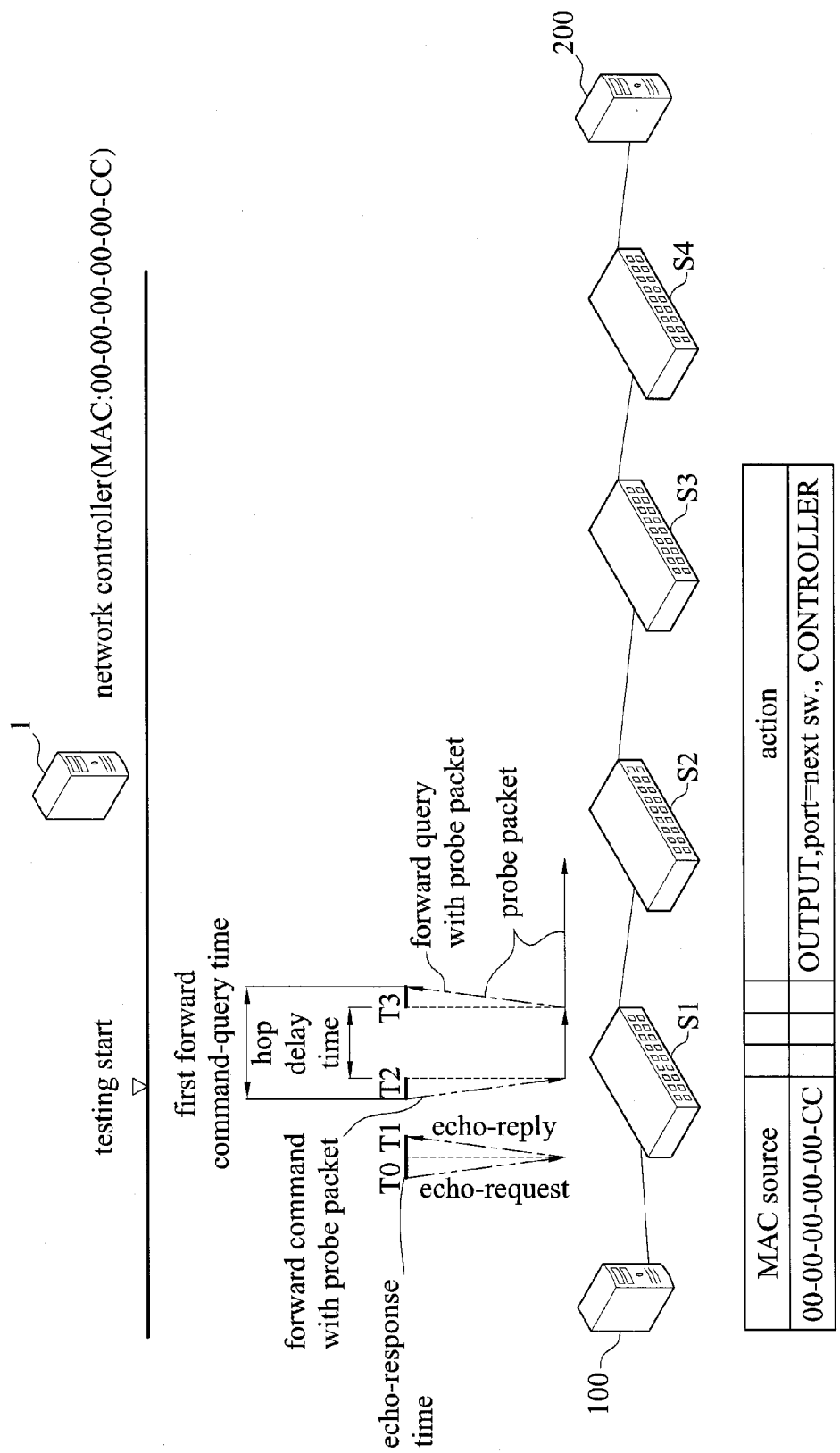
FIG. 4A is a schematic diagram illustrating a delay measurement system in SDN that measures echo-response time and a first forward command-query time according to the present disclosure.
Figure 4B:
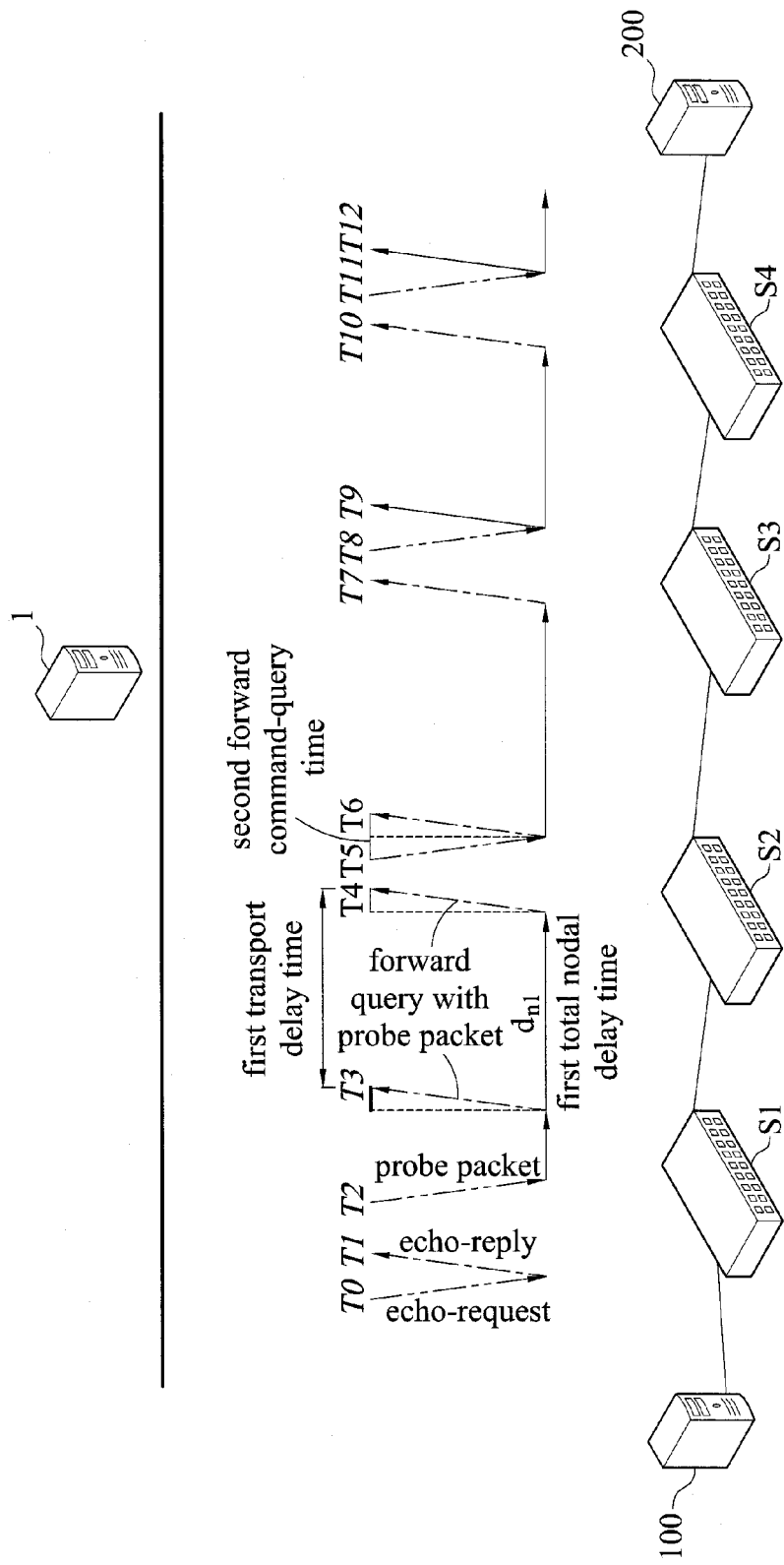
FIG. 4B is a schematic diagram illustrating a delay measurement system in SDN that measures a first transport delay time and a second forward command-query time according to the present disclosure.
Figure 4C:
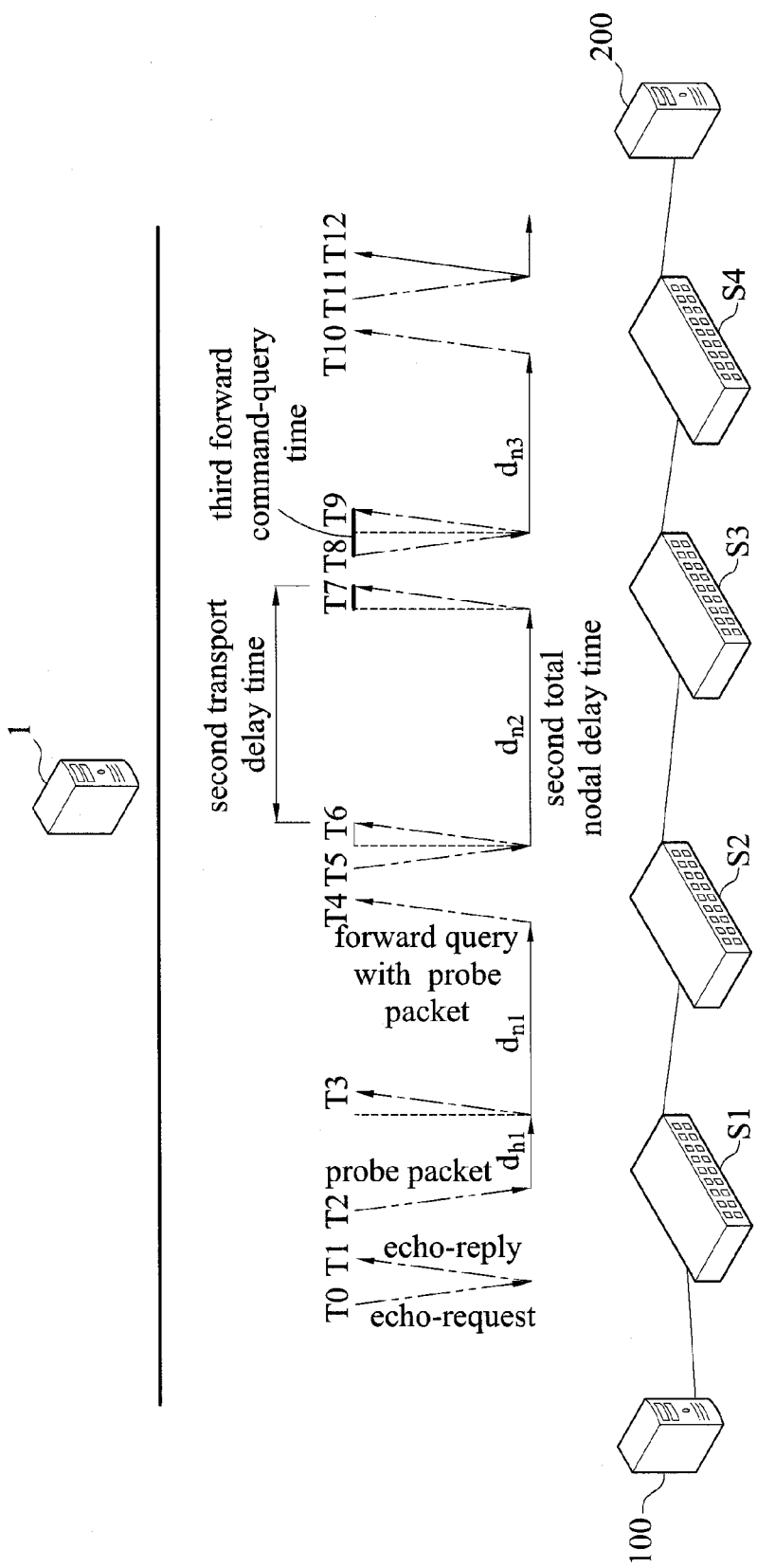
FIG. 4C is a schematic diagram illustrating a delay measurement system in SDN that measures a regular transport delay time and echo-response time according to the present disclosure.

FIGS. 4A to 4C are schematic diagrams illustrating a delay measurement system in SDN that measures echo-response time, transport delay time and forward command-query time, and calculates delay time according to the present disclosure.

As shown in FIG. 4A, the initial setting, the echo-response time and transport delay time measurement are described. An operator indicates which one of the flows is to be measured. The flows are referred to a group which have same source and destination in their header. For the packet transmission between the equipment 100 and the equipment 200 shown in FIG. 4A, the network controller 1 will know the addresses (e.g., IP and Mac address) of all network switches through the flow path. The network controller obtains the average packet length of the flow by continually querying the network switch, so as to determine the length of the probe packet.

As shown in FIG. 4A, initially the network controller 1 directs the head network switch S1 to forward the probe packet, by launching a control message (e.g., by using Flow_Modify), to request the head network switch S1 to add an additional flow entry. The flow entry has contents that direct the head network switch S1 to return the probe packet to the network controller 1 and forward the probe packet to a next network switch, e.g., the network switch S2. By contrast, the conventional OpenFlow has only one destination. In more specific, FIG. 4A shows a flow table of the head network switch S1, in which 00-00-00-00-00-CC indicates the MAC address of the network controller 1. The head network switch S1, after receiving a probe packet having the MAC source address of the network controller 1, launches the probe packet to the network controller 1 (the port in the flow table) and the next network switch S2 (the next network switch in the flow table).

The echo-response time and the transport delay time are measured. The network controller 1 measures the echo-response time between the network controller 1 and the head network switch S1, by an echo-request (e.g., ECHO_Request) to the head network switch S1 and receiving an echo-response (e.g., ECHO_Reply) immediately returned from the head network switch S1. The echo-response time is T1−T0. At time point T2, the network controller 1 launches a probe packet to the head network switch S1. In general, the head network switch S1, after receiving a forward command message (e.g., PACKET_OUT), will forward an data packet carried by the control message. However, the control message in the embodiment is to request the network switch S1 to lookup the flow table and follow the matched entry in the flow table to forward the data packet. The network switch S1 will find out a flow entry that is newly added by the network controller 1 initially. The flow entry indicates that the probe packet should be transmitted to the next network switch S2 and the network controller 1. A time point when the network controller 1 receives the probe packet returned by the head network switch S1 is defined to be T3. Therefore, the hop delay time of the head network switch S1 is calculated, i.e., $d_{h1}=T3-T2-(T1-T0)$. The hop delay time is the time consumed by the head network switch S1 to process the probe packet.

As shown in FIG. 4B, the first transport delay time and second forward command-query time measurement performed by the delay measurement system is described. The probe packet is forwarded from the head network switch S1 to the network switch S2, and the network switch S2, after receiving the probe packet, will launch an forward query message (e.g., PACKET_IN) to query the network controller 1 about how to forward the probe packet at a time point that is defined to be T4. The network controller 1 replies to the network switch S2 with a forward command message (e.g., PACKET_OUT) at a time point that is defined to be T5. The forward command directs the network switch S2 that the probe packet has two destinations, one for the network controller 1 and the other for a further next network switch (e.g., the network switch S3), where the probe packet should be transmitted. The network switch S2 will launch the forward query to the network controller 1 every time when receiving the probe packet. The network controller 1 will not ask the network switch S2 to add an additional flow entry relating to forwarding the probe packet. As a result, the network switch S2, every time when receiving the probe packet, will lookup its own flow table and cannot match any entry, then query the network controller 1, and will not have any additional flow entry added low to the forwarding of the probe packet. In such a scenario, the packet forwarded could comply with an actual situation, which is header parsing, table lookup and forwarding. A time point when the network switch S2 returns the probe packet to the network controller 1 again is defined to be T6, and the first total nodal delay time from the head network switch S1 to the network switch S2 is obtained, i.e., $d_{n1}=(T4-T3)+(T1-T0)/2-(T6-T5)/2$. The first total nodal delay time is referred to the transport delay between two network switches (e.g., the network switch S1 and the next network switch S2) added by the hop delay time of the next network switch S2. A second total nodal delay time between the next network switch S2 and the further next network switch S3 could be calculated in the same manner used for the calculation of the first total nodal delay time.

As shown in FIG. 4C, the measurement of regular delay time is described. It could be known from the previous description that in the embodiment the delay time of the network switch in a normal operation is measured, and the control message delay transmitted between the network controller and the network switch will not add in the delay calculation. The delay time in each link will be added by the time (e.g., $(T6-T5)/2$ of $d_{n2}$) that should have been added because when the link delay is measured the time is already elapsed, and subtracted by the time (e.g., $(T9-T8)/2$ of $d_{n2}$) that should have been subtracted because when the time is elapsed the link delay already ends. Such a calculation result is a simple total nodal delay time.

As shown in FIG. 4C, the following equations could be obtained:
$d_{h1}=T3-T2-(T1-T0)$,
$d_{n1}=(T4-T3)+(T1-T0)/2-(T6-T5)/2$,
$d_{n2}=(T7-T6)+(T6-T5)/2-(T9-T8)/2$, and
$d_{n3}=(T10-T9)+(T9-T8)/2-(T12-T11)/2$.

Therefore, the network switches S3, S4, etc., following the second network switch, could have their normal delay time calculated for the same mechanisms, further descriptions omitted. The measurement results after $d_{n2}$ could be induced as:
$d_{nx}=(T_{3x+1}-T_{3x})+(T_{3x}-T_{3x-1})/2+(T_{3(x+1)}-T_{3(x+1)-1})/2$,
x=2, 3, 4, . . . .

The present disclosure provides a network controller for delay measurement in SDN and related delay measurement system and delay measurement method that do not change the transmission mechanism and the equipment of the network controller and the network switches of the original OpenFlow in an SDN environment, but changes the operation timing of just using the OpenFlow. A probe packet is sent for the delay measurement to be performed in each link of a flow path, and a critical hop could thus be found out. Compared with to the current actively and passively measuring methods, the present disclosure neither consumes much network resources nor changes the current network framework significantly, which helps an SDN control system to select a path and a network manager to adjust the network framework.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A network controller for delay measurement in a software defined network (SDN), comprising:
   a non-transitory storage device and a hardware processor connected with the non-transitory storage device to perform a delay measurement method, including:
   acquiring a list of network switches on a path-under-measurement and transmits a flow entry to a flow table of a head network switch in the path-under-measurement;
   measuring an echo-response time between the network controller and the head network switch, launches a probe packet to the head network switch, and measures a first forward command-query time taken by the probe packet to make a roundtrip of the head network switch;
   measuring a first transport delay time taken by the probe packet to travel from the head network switch to a next network switch and a second forward command-query time taken by the probe packet to make a roundtrip between the network controller and the next network switch, wherein the next network switch then forwards the probe packet to a further next network switch, and measuring a second transport delay time taken by the probe packet to travel from the next network switch to the further next network switch and a third forward command-query time taken by the probe packet to make a roundtrip between the network controller and the further next network switch; and
   calculating a hop delay time of the head network switch from the echo-response time and the first forward command-query time, calculates a first total nodal delay time from the echo-response time, the first transport delay time, and the second forward command-query time, and calculates a second total nodal delay time from the second forward command-query time, the second transport delay time and the third forward command-query time, wherein the network controller measures transport delay time and forwards command-query time of other network switches in the path-under-measurement following the further next network switch in a same way as measuring the first transport delay time and the second forward command-query time of the further next network switch, and calculates total nodal delay time of the other network switches.

2. The network controller of claim 1, wherein the echo-response time is referred to time taken by the network controller to launch an echo-request to the head network switch and taken by the head network switch to immediately launch an echo-reply to the network controller.

3. The network controller of claim 1, wherein the head network switch forwards the probe packet to the next network switch according to the flow entry of the flow table, and the flow entry recites returning the probe packet to the network controller and transmitting the probe packet to the next network switch.

4. The network controller of claim 1, wherein the first forward command-query time is referred to time taken by the network controller from launching the probe packet to receiving the probe packet returned from the head network switch, the second forward command-query time is referred to time taken by the network controller from launching the probe packet to receiving the probe packet returned from the next network switch, and the third forward command-query time is referred to time taken by the network controller from launching the probe packet to receiving the probe packet returned from the further next network switch.

5. The network controller of claim 1, wherein the first total nodal delay time is referred to time from the head network switch to the next network switch, and the second total nodal delay time is time from the next network switch to the further next network switch.

6. A delay measurement method in SDN, comprising:
enabling a network controller to transmit a control message to a head network switch to add a flow entry in a flow table of a head network switch;
enabling the network controller to transmit a probe packet to the head network switch, so as for the head network switch to forward the probe packet to the network controller and a next network switch according to the flow entry of the flow table, wherein the network controller records an echo-response time between the network controller and the head network switch and a first forward command-query time taken by the probe packet to make a roundtrip between the network controller and the head network switch, in order to calculate a hop delay time of the head network switch from the first forward command-query time and the echo-response time;
having the next network switch, after receiving the probe packet, transmit a forward query message that has the probe packet to the network controller, and enabling the network controller to transmit a forward command that has the probe packet to the next network switch to direct the next network switch to transmit the probe packet to the network controller and a further next network switch; and
enabling the network controller to record a first transport delay time taken by the probe packet to travel from the head network switch to the next network switch and a second forward command-query time taken by the probe packet to make a roundtrip between the network controller and the next network switch, to calculate a first total nodal delay time from the echo-response time, the first transport delay time and the second forward command-query time, and enabling the network controller to record a second transport delay time and a third forward command-query time in a same way as recording the first transport delay time and the second forward command-query time, respectively, to calculate a second total nodal delay time from the second forward command-query time, the second transport delay time and the third forward command-query time, and obtaining a total nodal delay time between two consecutive network switches following the further next network switch based on measurement mechanisms for the second total nodal delay time and calculation mechanisms for the second total nodal delay time.

7. The delay measurement method of claim 6, wherein the hop delay time is equal to the first forward command-query time subtracted by the echo-response time.

8. The delay measurement method of claim 6, wherein the first total nodal delay time is equal to the first transport delay time added by a half of the echo-response time and subtracted by a half of the second forward command-query time, the second total nodal delay time is equal to the second transport delay time added by a half of the second forward command-query and subtracted by a half of the third forward command-query time, and a following total nodal delay time is obtained based on the above calculation mechanism for the second total nodal delay time.

9. A delay measurement system in SDN, comprising:
a network controller that measures a path-under-measurement and launches a probe packet, to record an echo-response time between the network controller and one of network switches in the path-under-measurement, a roundtrip time taken by the probe packet to make a roundtrip of the one of the network switches, and a first transport delay time between two consecutive network switches in the network switches; and
a head network switch that, after receiving the probe packet, returns the probe packet to the network controller and to a next network switch in the path-under-measurement according to a flow entry predetermined by a flow table of the head network switch,
wherein the next network switch receives the probe packet and, after receiving the probe packet, launches a forward query message to the network controller to obtain a transmission destination of the probe packet, and the transmission destination includes returning to the network controller and transmitted to a following network switch, and
wherein the network controller calculates a hop delay time of the head network switch from an echo-response time between the network controller and the head network switch and a first forward command-query time taken by the probe packet to make a roundtrip between the network controller and the head network switch, calculates a first total nodal delay time from the echo-response time, a first transport delay time taken by the probe packet to travel from the head network switch to the next network switch, and a second forward command-query time taken by the probe packet to make a roundtrip between the network controller and the next network switch, measures a second transport delay time and a third forward command-query time in a same way as measuring the first transport delay time and the second forward command-query time, respectively, and calculates a second total nodal delay time from the second forward command-query time, the second transport delay time and the third forward command-query time, to obtain a total nodal delay time between two following consecutive network switches based on measurement mechanisms for the second total nodal delay time and calculation mechanisms for the second total nodal delay time.

10. The delay measurement system of claim 9, wherein the echo-response time is referred to time taken by the network controller to launch an echo-request to the head network switch and taken by the head network switch to immediately launch an echo-reply to the network controller.

* * * * *